(12) United States Patent
Pocchiola

(10) Patent No.: US 7,413,238 B2
(45) Date of Patent: Aug. 19, 2008

(54) WIND DEFLECTOR FOR A VEHICLE ROOF

(75) Inventor: Viter Sergio Pocchiola, Mezzenile (TO) (IT)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/573,154

(22) PCT Filed: Jul. 27, 2005

(86) PCT No.: PCT/DE2005/001331

§ 371 (c)(1),
(2), (4) Date: Feb. 2, 2007

(87) PCT Pub. No.: WO2006/012861

PCT Pub. Date: Feb. 9, 2006

(65) Prior Publication Data

US 2007/0222260 A1 Sep. 27, 2007

(30) Foreign Application Priority Data

Aug. 2, 2004 (DE) .................. 10 2004 037 646

(51) Int. Cl.
*B60R 27/00* (2006.01)
(52) U.S. Cl. .................. 296/180.2; 296/180.1; 296/217
(58) Field of Classification Search .................. 296/91, 296/180.1, 180.2, 180.4, 217
See application file for complete search history.

(56) References Cited

U.S. PATENT DOCUMENTS 6,669,277 B2 12/2003 Färber et al.
7,059,668 B2 * 6/2006 Van De Putten et al. .... 296/217

FOREIGN PATENT DOCUMENTS

| BE | 572858 A | 5/1959 |
|---|---|---|
| DE | 4239428 A1 | 3/1994 |
| DE | 19930049 A1 | 1/2001 |
| DE | 10336361 B3 | 6/2005 |
| EP | 0490213 A1 | 6/1992 |

OTHER PUBLICATIONS

International Search Report for International Application No. PCT/DE2005/001331.

* cited by examiner

*Primary Examiner*—Lori L Lyjak
(74) *Attorney, Agent, or Firm*—David S. Safran

(57) ABSTRACT

A wind deflector (10) for a motor vehicle roof (2) with a roof opening (4) which can be closed by means of a movable cover (6), is located along the front edge of the roof opening (4) and can be moved between an inactive position which is retracted into the outside contour of the roof and a raised operating position, the effective area exposed to the incident flow of the head wind being formed from an air-permeable net (12). The net (12) which forms the effective area is made of several sections of different fabric density which are located next to one another. The net (12) can be a one-piece fabric with several sections of different fabric density made by means of a corresponding weaving technique, so that the net (12) does not have any seams or other connecting sites between the individual sections.

12 Claims, 2 Drawing Sheets

WIND DEFLECTOR FOR A VEHICLE ROOF

BACKGROUND OF THE INVENTION

1. Field of the Invention

This invention relates to a wind deflector for a motor vehicle roof with a roof opening which can be closed by means of an adjustable cover, comprising a wind deflector which is located along the front edge of the roof opening and which can be moved between an inactive position which is retracted into the outside contour of the roof and a raised operating position, the effective area of the wind deflector exposed to the incident flow of the head wind being provided with an air-permeable net.

2. Description of Related Art

Wind deflectors of this type are designed to deflect the air incident on the wind deflector at least partially upward, with which, on the one hand, direct incident flow on the passengers is prevented, and on the other, the noise caused by the incident air is reduced.

German Patent Application DE 42 39 428 A1 discloses a wind deflector which is formed by an elastic net clamped in a frame. By using an elastic net, the negative pressure in the vehicle interior will be replenished in proportionate form and disturbing wind noise and draft phenomena will be minimized. However, it has been shown that the expected effect is inadequate for a net which is made the same over the entire width of the wind deflector, since the incident flow conditions, and optionally, the outflow conditions which are desirable behind the net are different over the width of the net, but there has not been any adaptation to these different conditions.

European Patent Application EP 0 490 213 A1 discloses a wind deflector which is provided with an air-permeable net in partial regions of its surface. Embodiments in this respect have a wind deflector which has been formed in itself by a rigid surface and which is provided with several openings which are distributed over its width and which for their part are each covered by a net. The openings distributed over the width of the wind deflector and the assigned nets are each the same so that, in this case, there is no adaptation to incident flow and outflow conditions which are different over the width of the wind deflector.

SUMMARY OF THE INVENTION

The object of the invention is to devise a wind deflector of the initially mentioned type which is simpler in construction, and economically enables adaptation to incident flow and outflow conditions which are different over the width of the wind deflector.

This object is achieved in accordance with the invention by a wind deflector in accordance with the invention in which the effective area is formed as a net or the like, having several sections of different fabric density which are located next to one another in the width direction.

It should be noted here that the term "net" is defined as all conceivable net-like structures, i.e., for example, knotted nets, fabric, perforated films or the like.

The configuration of the wind deflector in accordance with the invention makes it possible to optimally adapt it to the incident flow conditions or desired outflow conditions which are different in the widthwise direction and which can be different from one type of vehicle to another.

It has been shown in tests that a satisfactory effect can be achieved with only two different fabric densities, sections with a first fabric density alternating with sections with a second fabric density. A plurality of versions can be implemented by choosing the number and width of sections. In one especially simple version, there is a middle section with a first fabric density adjoined on either side by a respective section with a second fabric density.

In one preferred embodiment of the invention, it is provided that a middle section with a first fabric density is adjoined on either side by several sections with a second fabric density, which, in turn, is bordered by a section with a first fabric density, etc. This yields an arrangement of the sections which is symmetrical to the vertical lengthwise center plane of the vehicle. The number and the respective width of the sections are variable and can be adapted to the respective requirements, for example, by tests, and thus, optimized.

In a first version, the first fabric density is greater than the second fabric density, i.e., a middle section with a greater fabric density is adjoined laterally by sections with a lower fabric density, the latter bordered again by a respective section with a higher fabric density etc.

According to a second version, the first fabric density is less than the second fabric density, i.e., the sequence of sections is the reverse of the case of the first version.

In turn, tests have shown that it is sufficient if the middle section is adjoined by three sections on either side; this yields an arrangement which is acceptable with respect to production cost and which is satisfactory with respect to the desired effect.

Satisfactory results were achieved with a wind deflector in which the sections with greater fabric density were made largely airtight and the sections with the lower fabric density were made as nets with a comparatively large mesh width. The air flow incident on the sections with greater fabric density pass through the fabric only to a small degree, while a larger portion is deflected up and to the side. The air which is incident on the sections with a lower fabric density, conversely, largely passes through the fabric with formation of turbulence, while only a small part, or a part which is negligibly small, depending on the mesh width, is deflected. In this way, gentle swirling is achieved which acts neither as a burdensome draft for the passengers nor causes disturbing noise development.

According to one embodiment of the invention which is preferred in terms of production engineering, it is provided that the net is a one-piece fabric with sections of different fabric density. The individual sections adjoin one another seamlessly, the respective width of the sections and the fabric density selected in them being determined in the production of the net and being implemented by a corresponding weaving technique.

The net is preferably clamped into a frame structure which is movably located in the region of the front edge of the roof opening and which can be adjusted via actuation means between the operating position and inactive position, as is known.

Several embodiments of the invention are shown in the drawings and are explained in detail below.

DETAILED DESCRIPTION OF THE INVENTION

Figure 1:
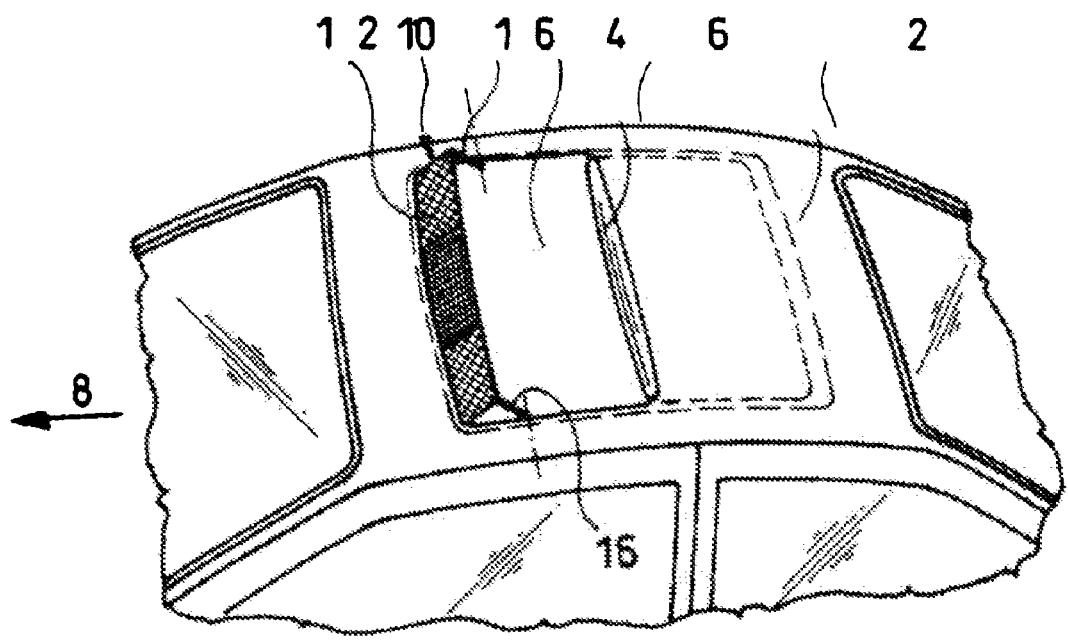
FIG. 1 is a perspective view a vehicle roof with an opened roof opening and a raised wind deflector.

FIG. 1 shows, in a perspective view obliquely from overhead, a vehicle roof 2 with a roof opening 4 which can be alternately cleared or closed by means of a movable cover 6. FIG. 1 shows the cover 6 in a position in which the roof opening 4 is opened.

On the edge of the roof opening 4 which is the front edge with respect to the direction of travel 8, there is a wind deflector 10 which can be moved by positioning means which (not shown) between an inactive position which is retracted into the outside contour of the roof with the roof opening 4 closed and the raised operating position which is shown in FIG. 1, with the roof opening 4 open. The actual wind deflecting surface of the wind deflector 10 comprises a net 12 made of several sections of different fabric density.

Figure 2:
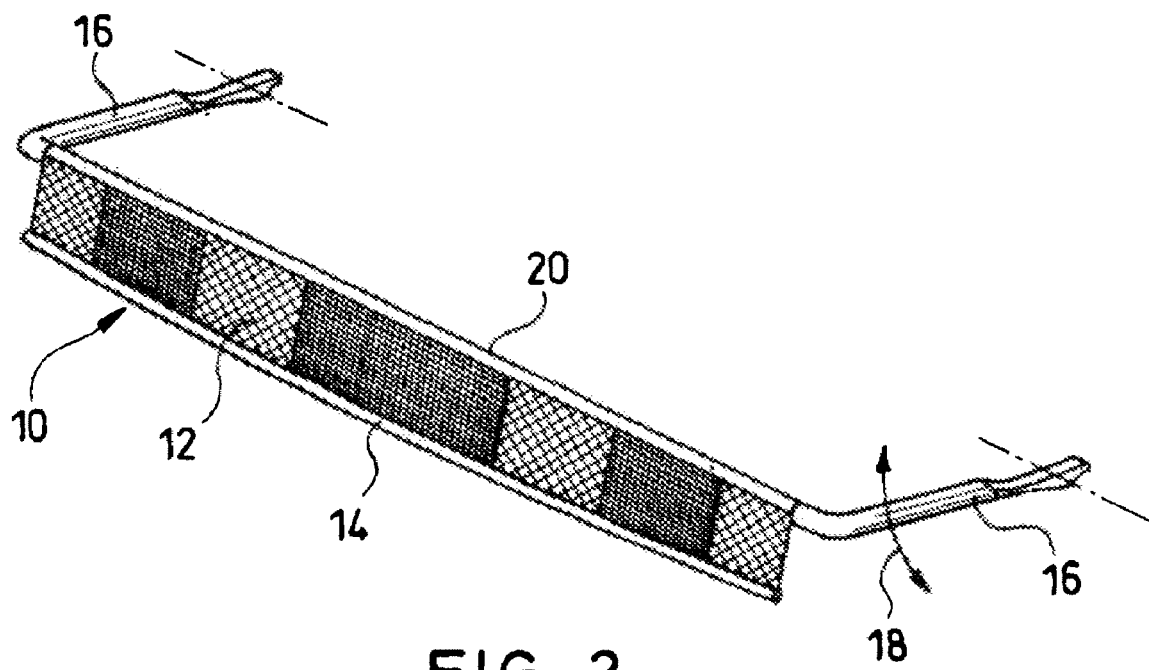
FIG. 2 is in an enlarged perspective of a wind deflector roughly according to FIG. 1.

As shown especially by FIG. 2, the net 12 is clamped between a lower frame brace 14 located permanently on the vehicle roof and an upper frame brace 20 which can be pivoted via connecting rods 16 in the direction of the arrow 18. For the inactive position, the upper frame brace 20 is pivoted down into the position retracted into the outside roof contour, the net 12 forming a fold. For the operating position, the upper frame brace 20 is pivoted up, by which the net 12 is moved into a position which is exposed to incident flow of the head wind, and tensioned.

Figure 3:
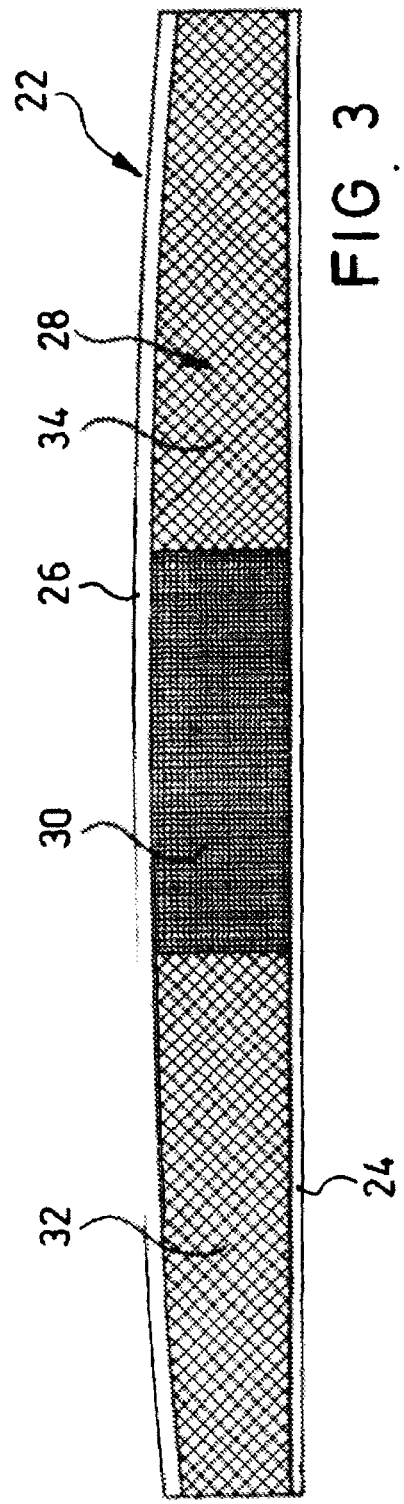
FIGS. 3 to 5 each show schematically different net versions for a wind deflector according to FIGS. 1 & 2.

FIG. 3 shows a wind deflector 22 with a net 28 which is clamped between a lower frame brace 24 and an upper frame brace 26. The net 28 has a middle section 30 with a high fabric density, adjoined on either side by a respective section 32, 34 with a low fabric density. As was already stated above, the fabric density of the middle section 30 is so great that only a small portion of the incident air passes through, while a larger portion of the air is deflected upward and also to the side.

Figure 4:
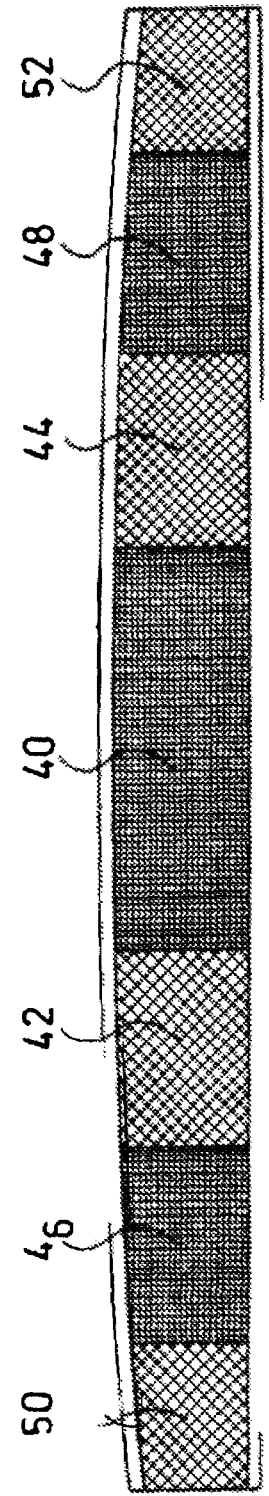

FIG. 4 shows an arrangement similar to FIG. 3 with a middle section 40 of high fabric density; the middle section 40 is adjoined to either side by a section 42, 44 of low fabric density, another section 46, 48, of high fabric density and another section 50, 52 of low fabric density.

Figure 5:
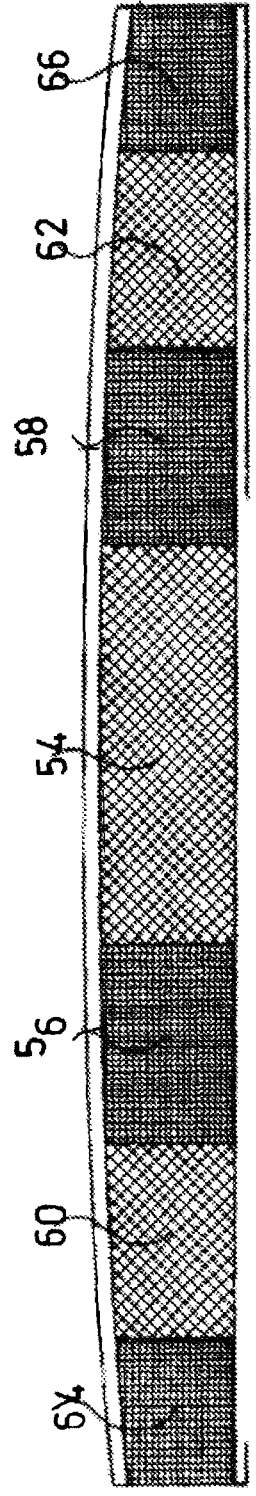

FIG. 5 shows an arrangement with a middle section 54 of low fabric density adjoined laterally by a respective section 56 58, of high fabric density, another section 60, 62, of low fabric density, and a section 64, 66, of high fabric density. The arrangement as shown in FIG. 5 thus constitutes essentially a reversal of the arrangement as shown in FIG. 4.

As was likewise already stated above, the nets shown in FIGS. 3 to 5 are made preferably by means of a suitable weaving technique or production technique as a one-piece fabric without seams or other connecting sites between the individual sections.

What is claimed is:

1. Wind deflector for a motor vehicle roof with a roof opening which can be closed by means of a movable cover, comprising a wind deflector element which is located along a front edge of the roof opening and which is movable between an inactive position which is retracted into the outside contour of the roof and a raised operating position, the wind deflector having an effective area exposed to incident flow of a head wind during forward movement of the motor vehicle that is formed by an air-permeable net, the net being comprised of several sections of different fabric density which are located next to one another along the front edge of the roof opening in a widthwise direction of the roof opening.

2. Wind deflector for a motor vehicle roof with a roof opening which can be closed by means of a movable cover, comprising a wind deflector element which is located along a front edge of the roof opening and which is movable between an inactive position which is retracted into the outside contour of the roof and a raised operating position, the wind deflector having an effective area exposed to incident flow of a head wind during forward movement of the motor vehicle that is formed by an air-permeable net, the net being comprised of several sections of different fabric density which are located next to one another in a widthwise direction of the roof opening; wherein sections of a first fabric density and sections of a second fabric density alternate with each other.

3. Wind deflector as claimed in claim 2, wherein a middle section of said several sections if formed with said first fabric density and is adjoined to either side by sections with said second fabric density and is, in turn, adjoined by sections with said first fabric density.

4. Wind deflector as claimed in claim 3, wherein the arrangement of the sections, is symmetrical to a vertical lengthwise center plane of the vehicle.

5. Wind deflector as claimed in claim 3, wherein the sections of the first fabric density are larger than the sections of second fabric density.

6. Wind deflector as claimed in claim 3, wherein the sections of the first fabric density are smaller than the sections of the second fabric density.

7. Wind deflector as claimed in claim 3, wherein the middle section is adjoined to either side by three sections.

8. Wind deflector as claimed in claim 2, wherein those of said sections having a greater fabric density are substantially airtight.

9. Wind deflector as claimed in claim 8, wherein those of said sections having a lesser fabric density are nets with a large mesh width.

10. Wind deflector as claimed in claim 1, wherein the net is a one-piece fabric with sections of different fabric density.

11. Wind deflector as claimed in claim 1, wherein the net is clamped in a frame structure.

12. Wind deflector for a motor vehicle roof with a roof opening which can be closed by means of a movable cover, comprising a wind deflector element which is located along a front edge of the roof opening and which is movable between an inactive position which is retracted into the outside contour of the roof and a raised operating position, the wind deflector having an effective area exposed to incident flow of a head wind during forward movement of the motor vehicle that is formed by an air-permeable net, the net being comprised of several sections of different fabric density which are located next to one another in a widthwise direction of the roof opening, and wherein some of said sections have a fabric density which is substantially airtight.

* * * * *